(12) United States Patent
Kobayashi (10) Patent No.: US 6,967,676 B1
(45) Date of Patent: Nov. 22, 2005

(54) PRINTER-INCORPORATED ELECTRONIC STILL CAMERA AND PRINTING METHOD FOR OPTICAL PRINTER

(75) Inventor: Shigeto Kobayashi, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 774 days.

(21) Appl. No.: 09/705,794

(22) Filed: Nov. 6, 2000

(30) Foreign Application Priority Data

Nov. 4, 1999  (JP) ................................. 11-313311

(51) Int. Cl.⁷ .......................................... H04N 5/225
(52) U.S. Cl. ............................ 348/207.2; 348/207.99; 348/208.99
(58) Field of Search ................... 348/207.99, 207.2, 348/208.99, 208.2, 333.01, 333.02, 307.99, 348/353.01, 353.02; 347/262, 122, 121; 354/5; 358/296

(56) References Cited

U.S. PATENT DOCUMENTS

| | | | | |
|---|---|---|---|---|
| 4,318,597 A | * | 3/1982 | Kotani et al. | ................ 396/549 |
| 4,525,729 A | * | 6/1985 | Agulnek et al. | ............. 347/237 |
| 4,937,676 A | * | 6/1990 | Finelli et al. | ................ 348/375 |
| 5,847,836 A | * | 12/1998 | Suzuki | ........................ 348/371 |
| 6,229,565 B1 | * | 5/2001 | Bobry | .................... 348/207.99 |
| 6,295,080 B1 | * | 9/2001 | Deguchi et al. | ............. 347/262 |
| 6,628,333 B1 | * | 9/2003 | Gowda et al. | .......... 348/333.11 |

FOREIGN PATENT DOCUMENTS

JP   4-194832   7/1992   .......... G03B 17/52

OTHER PUBLICATIONS

Abstract of WO99/21055 Apr. 29, 1999.

* cited by examiner

Primary Examiner—David L. Ometz
Assistant Examiner—Gevell Selby
(74) Attorney, Agent, or Firm—Sughrue Mion, PLLC (57) ABSTRACT

A printer-incorporated electronic still camera has a built-in optical printer for printing an image on an instant film sheet based on electronic image signals read out from a memory. The optical printer uses a fluorescent display panel as a light source of a printing head. The fluorescent display panel is constituted of an array of light emitting elements arranged in a vacuum container. Before being driven to print an image based on the electronic image signals, all of the light emitting elements are driven for a constant time to remove deposited residual gas off the light emitting elements.

15 Claims, 9 Drawing Sheets

PRIOR ART

PRINTER-INCORPORATED ELECTRONIC STILL CAMERA AND PRINTING METHOD FOR OPTICAL PRINTER

BACKGROUND OF THE INVENTION

1. Field of the Invention

The present invention relates to a printer-incorporated electronic still camera and a printing method for an optical printer wherein a fluorescent display tube or panel is driven as a light source of a printing head based on electronic image data.

2. Background Arts

Portable electronic still cameras are widely known, that obtain electronic images from optical images of subjects through an imaging device, such as a CCD image sensor, and stores the electronic images in a memory in the form of digital image data. Also an electronic still camera having a printer incorporated therein has been known. An example of this type of electronic still camera is disclosed in JPA 11-127409, wherein a self-developing type photo film sheet, called an instant film, is used as a recording medium for printing an image thereon, so an optical printer is driven based on the image data read out from the memory, to photograph or optically record an image on the instant film.

The optical printer uses a recording head that is elongated in a main scan direction across an exposure surface of the instant film, and projects three color light beams onto the exposure surface while moving in parallel to the exposure surface in a sub scan direction perpendicular to the main scan direction. In this way, the image is recorded line after line on the instant film. The recording head is constituted of a liquid crystal array of a large number of light-permeable type liquid crystal segments which are driven each individually in accordance with print data of each pixel, an elongated fluorescent lamp for illuminating the liquid crystal array, and an optical system for directing exposure light beams from the liquid crystal array to the exposure surface of the instant film.

Recently, a study has been made to minimize the recording head by replacing the fluorescent lamp and the liquid crystal array with a fluorescent display panel. The fluorescent display panel is constituted of a micro light emitting elements arranged in a raw, and each light emitting element corresponds to one pixel, so the light intensity of each light emitting element may be controlled individually in accordance with the print data of the corresponding pixel.

Figure 11:
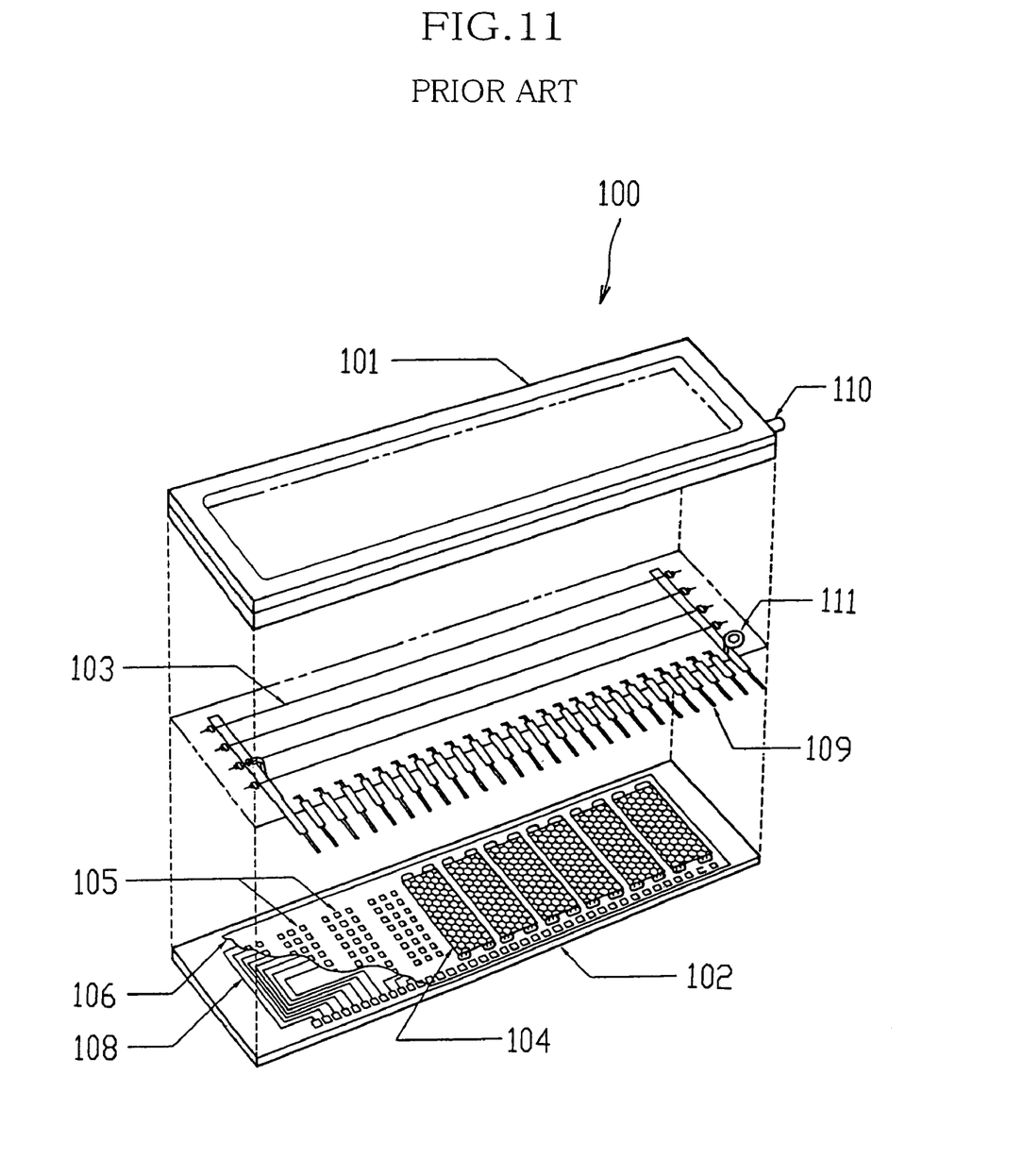
FIG. 11 is an exploded perspective view of a conventional fluorescent display panel.

FIG. 11 shows an example of fluorescent display panel 100. The fluorescent display tube 100 has a front glass 101 and a glass substrate 102 that constitute a vacuum container, in which a filament 103 as a cathode, a grid 104 and an anode 105 are contained as fundamental electrodes. Many kinds of metal parts and a coating layer 106 are also contained as subsidiary elements to the fundamental electrodes. The filament 103 consists of very fine tungsten core wires coated with an oxide, e.g. barium, and radiates thermions when a voltage is applied thereto. The grid 104 is a metal mesh made of stainless steel or the like, and accelerates and distributes the thermions from the filament 103 to direct them to the anode 105 when a positive voltage is applied thereto. When a negative voltage is applied, the grid 104 blocks the thermions from the anode 105.

The anode 105 is constructed by printing a fluorescent object in a display pattern on a conductor that is made of carbon or the like and is formed to have a similar shape to the display pattern. When a positive voltage is applied to the anode 105, the thermions accelerated and distributed by the grid 104 are made clash with each other, and thus excite the fluorescent object to emit light. Designated by 108, 109, 110 and 111 are anode wiring, lead terminals, an exhausting pipe, and a getter. The exhausting pipe 110 is provided for letting internal air out of the vacuum container during the manufacture. The getter 111 absorbs residual air or gas to maintain the interior of the container vacuum.

Although the getter 111 absorbs the residual gas in the container of the fluorescent display panel 100, it has been found that the getter will release the absorbed gas again with time, so the effect is insufficient. For this reason, the fluorescent display panel 100 has a disadvantage that luminance of the fluorescent object will be lowered if the fluorescent display panel 100 is turned on after being left inactive for a long time, e.g. for more than 48 hours, because the residual air or gas that includes impurity is deposited on the fluorescent object during the inactive period. Therefore, where the fluorescent display panel is used as the printing head for the printer-incorporated electronic still camera, a problem arises from the above disadvantage that the average density of printed images would be lowered after the printing head is unused for a long time.

SUMMARY OF THE INVENTION

In view of the foregoing, an object of the present invention is to provide a printing method for an optical printer using a fluorescent display panel as a light source of a printing head, the fluorescent display panel comprising an array of light emitting elements in a vacuum container, that prevents the average print density from being lowered because of the residual gas deposited on the light emitting elements.

Another object of the present invention is to provide a printer-incorporated electronic still camera using a fluorescent display panel as a light source of a printing head, whereby the fluorescent display panel may always emit light at uniform luminance, and thus the average print density is prevented from being lowered.

A printing method according to the present invention is characterized in that a preliminary emission process is executed before an optical printer actually starts printing an image, to drive all of light emitting elements of a fluorescent display panel for a constant time to remove deposited residual gas off the light emitting elements.

The preliminary emission process may be executed immediately before each image starts being printed, or immediately after a power switch of the printer is turned on.

According to the present invention, a printer-incorporated electronic still camera comprises a printing device that uses a fluorescent display panel as a light source of a printing head; and a driving device for driving the light emitting elements, the driving device making a preliminary emission process to drive all of the light emitting elements for a constant time before driving the light emitting elements to print an image on a photosensitive recording medium based on electronic image signals.

According to an embodiment, the driving device makes the preliminary emission process when a timer detects that the fluorescent display panel has not been driven for a predetermined time.

According to another embodiment, the driving device makes the preliminary emission process when a battery detection device detects that the power source batteries are newly loaded in the still camera.

According to still another embodiment, the driving device makes the preliminary emission process when it is detected that the photographic recording medium is newly loaded in the still camera.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENTS

Figure 1:
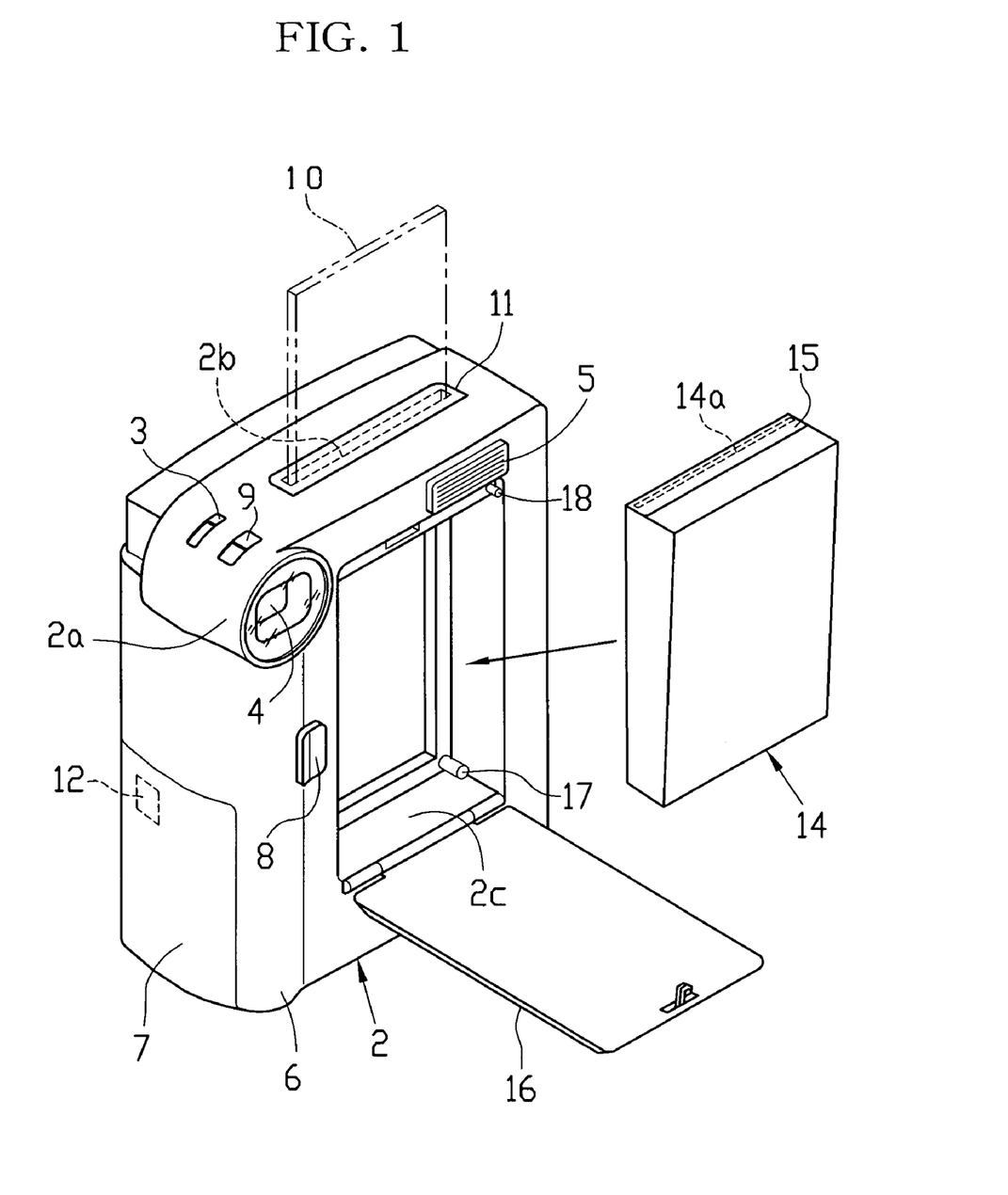
FIG. 1 is a front perspective view of a printer-incorporated electronic still camera according to an embodiment of the present invention, with its pack loading door open.
Figure 2:
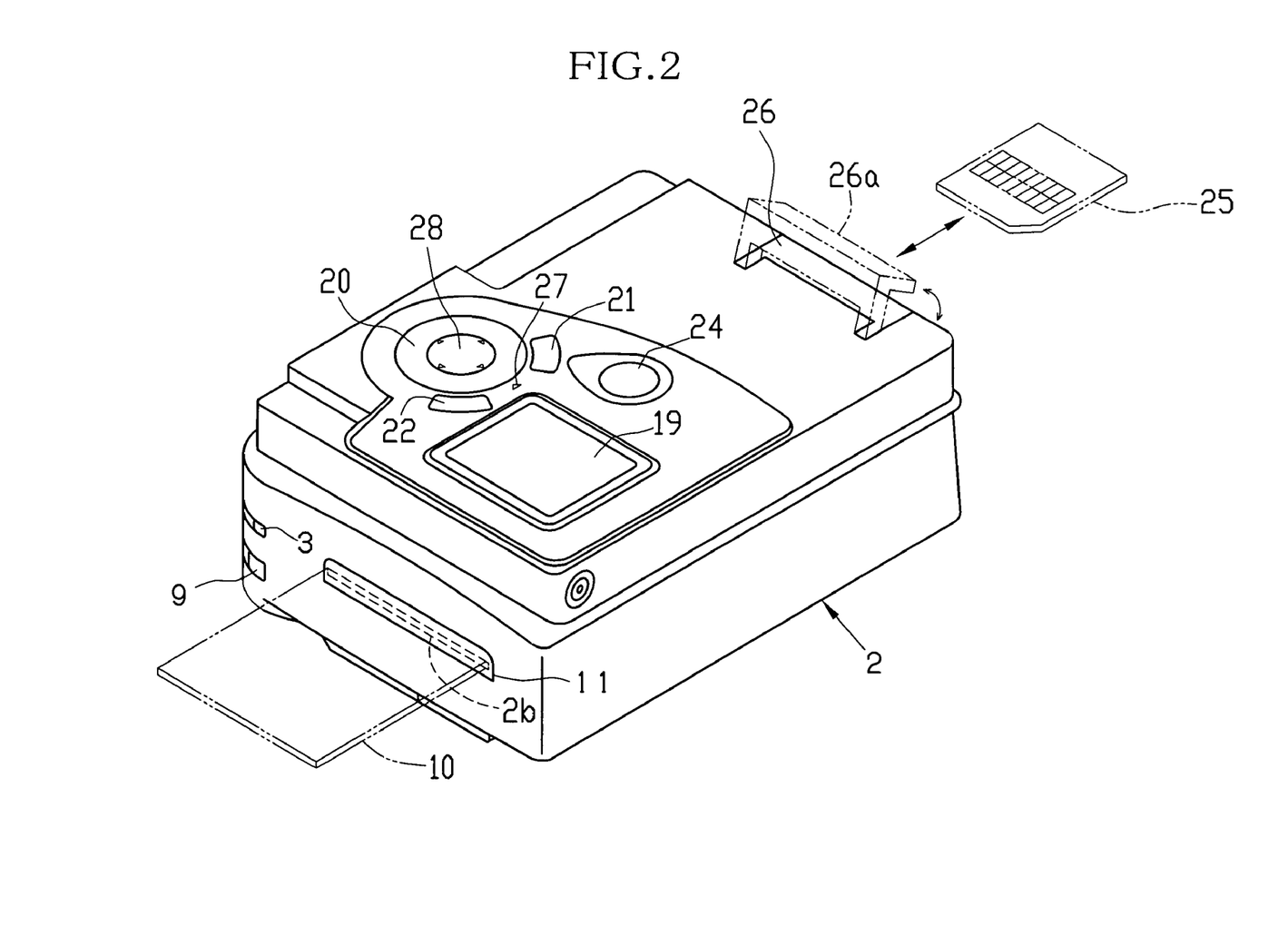
FIG. 2 is a rear perspective view of the printer-incorporated electronic still camera of FIG. 1, in a laid-down posture.

FIGS. 1 and 2 show an embodiment of a printer-incorporated electronic still camera, hereinafter called the still camera, wherein a power switch 3 and a close-up switch 9 are located on a top side of a camera body 2, and a camera lens 4 and a flash window 5 are located on an upper front portion of the camera body 2. A grip portion 6 contains a battery chamber therein, so a lid 7 is provided on the grip portion 6 to load or unload power source batteries, e.g. four AA type batteries connected in serial, by opening the lid 7. A battery sensor 12 is provided inside the battery chamber, for detecting whether the batteries are loaded or not. A release button 8 is located at a front position of the grip portion 6. The camera lens 4 is a pan-focus lens that includes a subject distance range from 1.2 m to an infinity in its depth of field, so it is fundamentally unnecessary to adjust focus of the camera lens 4. The close-up switch 9 is provided for permitting close-up photography in a range of several ten centimeters. It is alternatively possible to provide the still camera with a well-known automatic focusing device that uses trigonometry or a spatial frequency peak detection method. In that case, the camera lens 4 is focused on a subject distance upon the release button 8 being pressed halfway so far as the subject distance is in a standard range excluding the close-up range.

A film ejection slot 2b is formed through a top face of the camera body 2, through which an exposed instant film sheet 10 is ejected. The film ejection slot 2b is usually closed by a light-shielding door 11. The light-shielding door 11 is pushed open by the ejected instant film sheet 10. A pack loading door 16 is hinged to a front portion of the camera body 2. By opening the pack loading door 16, as shown in FIG. 1, a film pack 14 may be loaded in a pack loading chamber 2c.

Figure 3:
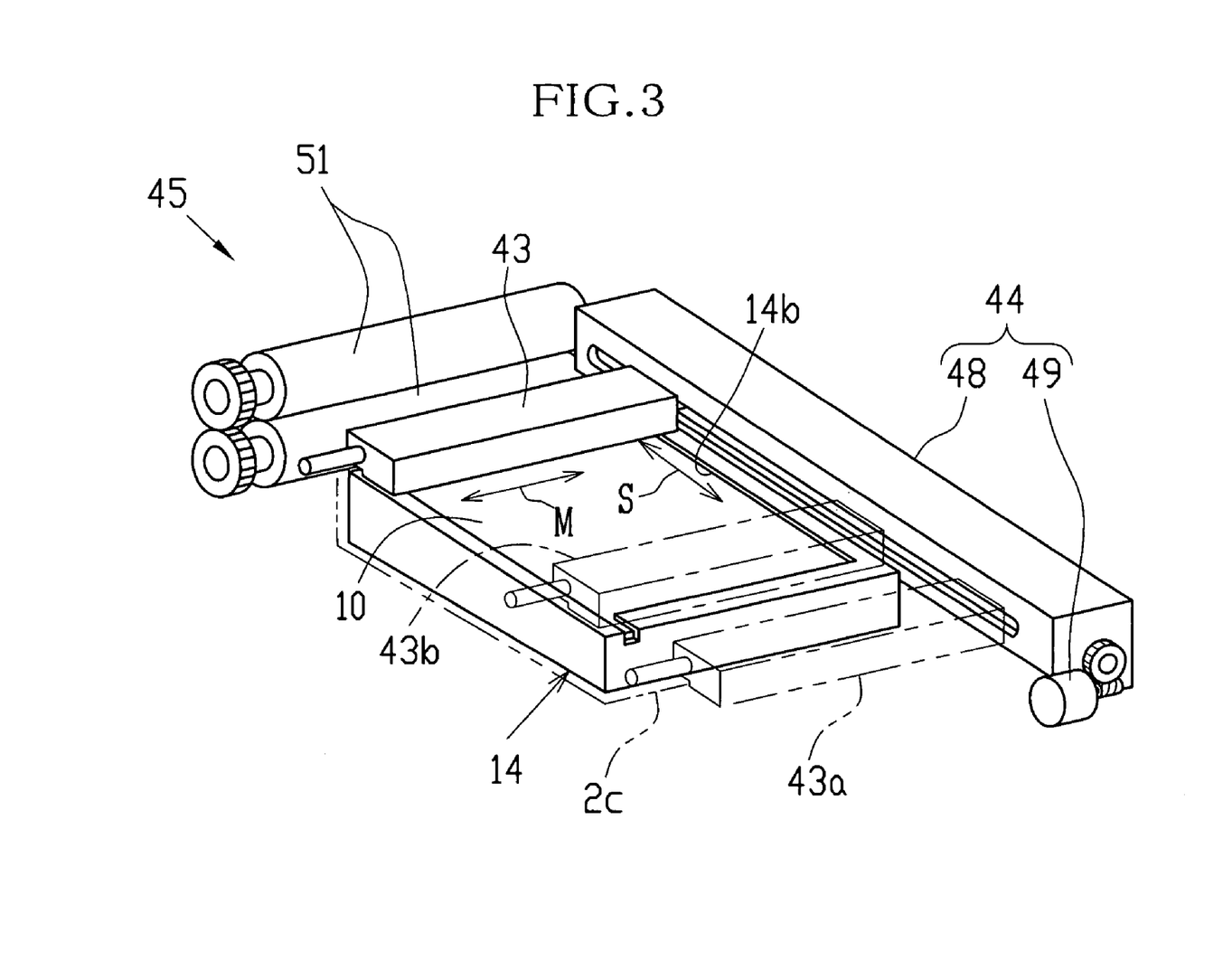
FIG. 3 is a schematic perspective view of an optical printer unit of the printer-incorporated electronic still camera.

The film pack 14 contains a predetermined number of, e.g. 10 sheets of, instant film sheets 10 in a stack. A slot 14a for letting the instant film sheets 10 one by one out of the film pack 14 is formed through a top face of the film pack 14. As shown in FIG. 3, an exposure opening 14b is formed through a front face of the film pack 14, that is oriented to the rear of the camera body 2 in the loaded position. The instant film sheet 10 is a well-known mono-sheet type. The mono-sheet type instant film sheet 10 is mainly constituted of a photosensitive layer, an image receiving layer, and a processing fluid pod. Before the film pack 14 is loaded in the still camera, the slot 14a is covered with a light-shielding cover 15 made of a resin film, whereas the exposure opening 14b is closed by a light-shielding sheet that is substantially equal in size of the instant film sheet 10 and is laid on an uppermost one of the stacked instant film sheets 10. When the release button 8 is pressed initially after the film pack 14 is newly loaded, the light-shielding sheet is ejected out of the film pack 14 through the slot 14a while pushing open the light-shielding cover 15, and then ejected out of the camera body 2 through the film ejection slot 2a. Then the photosensitive layer of the uppermost instant film sheet 10 is exposed through the exposure opening 14b.

A pack detection switch 17 is provided in the pack loading chamber 2c. The pack detection switch 17 is turned on when it is pressed by the film pack 14 as it is loaded in the pack loading chamber 2c. The pack detection switch 17 is turned off when the film pack 14 is unloaded. A door detection switch 18 is provided above the pack loading chamber 2c. The door detection switch 18 is turned on when it is pressed by the pack loading door 16 in its closed position, and is turned off when the pack loading door 16 is opened. Accordingly, it is possible to determine based on the switching conditions of these switches 17 and 18 when the film pack 14 is loaded or unloaded.

On the back side of the camera body 2, as shown in FIG. 2, an LCD panel 19, a mode selection dial 20, an execution key 21, a cancel key 22, and a print key 24 are provided. The LCD panel 19 constitutes an electronic viewfinder that displays moving images of subjects exist in a photographic field of the camera lens 3 in a real time fashion. For example, the LCD panel 19 is constituted of liquid crystal dot segments, micro color filters arranged in combination with the liquid crystal dot segments, and a fluorescent lamp for illuminating the liquid crystal dot segments with white light. A door member 26 is hinged to a bottom portion of the camera body 2. By opening the door member 26, as shown by phantom lines 26a in FIG. 2, a not-shown memory slot is exposed, for accepting an external memory 25, e.g. a Smart Media (a trade name), therein.

Although it is omitted from the drawings, tiltes of available modes, including a timer mode, a setup mode, a photography mode, a reproduction mode, are provided on the mode selection dial 20. By rotating the mode selection dial 20 to position one of these names at an index 27 that is provided at a peripheral position of the mode selection dial 20, the modes are switched over. A round cursor key 28 is provided in a center of the mode selection dial 20. The cursor key 28 is provided with four direction marks which are arranged at constant intervals around its circumference. By pressing one of the four direction marks, a cursor on the LCD display 19 is moved in the corresponding direction.

When the release button 8 is pressed in the photography mode, image data of an image displayed at that moment on the LCD panel 19 is stored in the external memory 25, as set forth in detail later. The LCD panel 19 may also display a still image based on stored image data in the reproduction mode. When the print key 24 is pressed in the reproduction mode, an image displayed on the LCD panel 19 starts being printed.

FIG. 3 shows an optical printer unit of the still camera, that is located on the back side of the pack loading chamber 2c. The optical printer section is constituted of a printing head 43, a head scanning mechanism 44, and a film advancing mechanism 45 including a pair of spread rollers 51 that are disposed behind the film ejection slot 2b. The printing head 43 extends in a main scan direction M, that is perpendicular to a film advancing direction from the film pack 14 to the spread rollers 51. The printing head 43 is moved by the head scanning mechanism 44 in a sub scan direction S that is parallel to the film advancing direction. The printing head 43 projects printing light beams onto the uppermost instant film sheet 10 across the width of the exposure opening 14b, as it moves in the sub scan direction S.

The head scanning mechanism 44 is constituted of a head conveying mechanism 48, and a scanning motor 49 for driving the head conveying mechanism 48. For example, the head conveying mechanism 48 consists of pulleys and a conveyer belt. The film advancing mechanism 45 is constituted of the spread rollers 51, a not-shown advancing claw, and a not-shown driving device for driving these elements. The film advancing mechanism 45 may be configured in the same way as those used in conventional instant cameras, such as disclosed in JPA 4-194832. The film advancing mechanism 45 is activated when an image is completely printed by the printing head 43, to advance the exposed instant film sheet 10 out of the film pack 14 through the spread rollers 51. While the instant film sheet 10 is being squeezed through the spread rollers 51, the pod is ruptured and the processing fluid is spread between the photosensitive layer and the image receiving layer. Thereby, a latent image formed on the photosensitive layer is transferred to the image receiving layer and developed into a positive image in a few minutes after the ejection.

Figure 4:
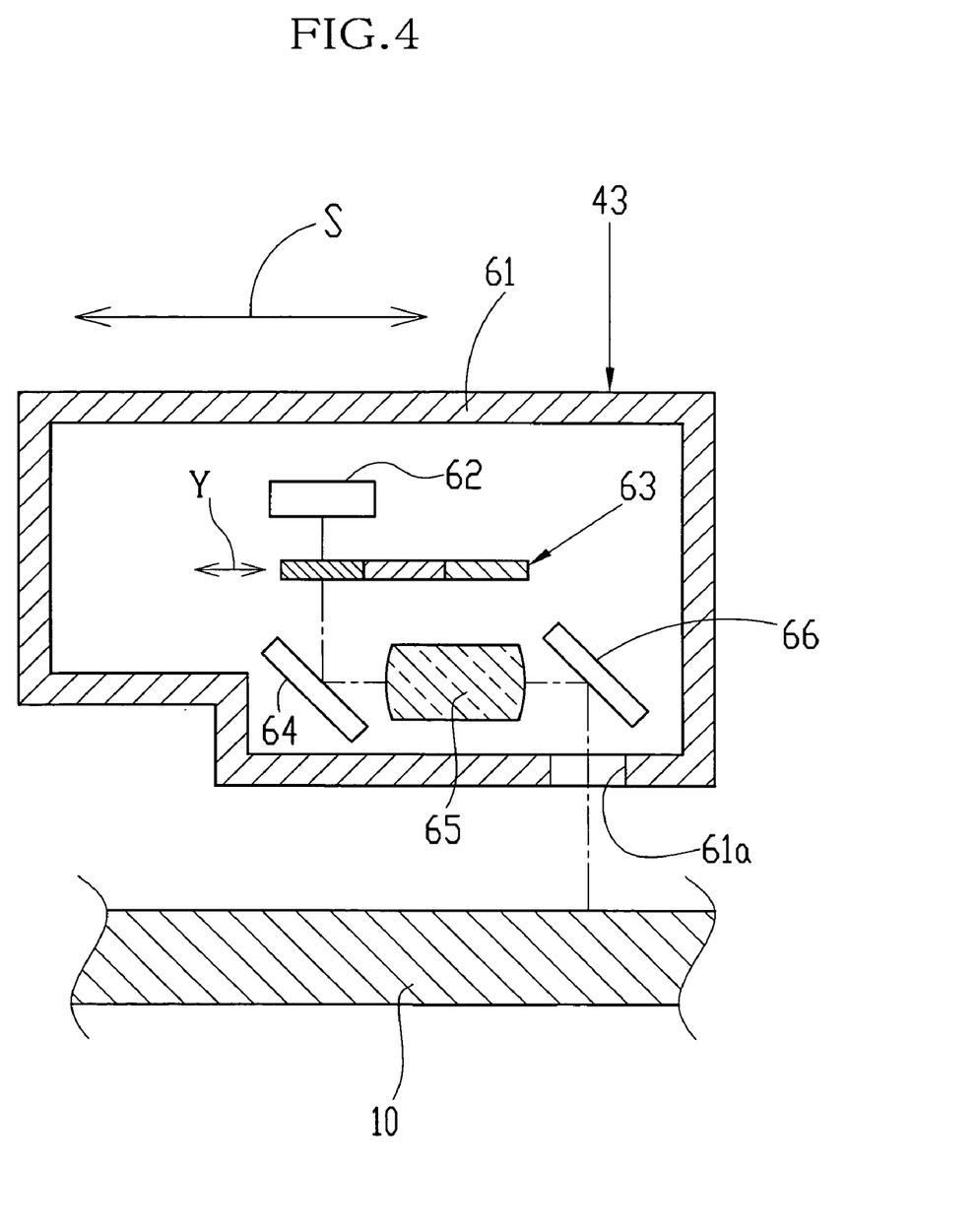
FIG. 4 is an explanatory diagram illustrating a section of a printing head of the optical printer unit.

FIG. 4 shows an example of the printing head 43. In a light-tight housing 61 is mounted a fluorescent display panel 62 that is elongated in the lengthwise direction of the printing head 43, i.e. the main scan direction M. The fluorescent display panel 62 emits white light that includes light components of red, green and blue. A color filter 63 is placed in a path of white light from the fluorescent display panel 62. The color filter 63 consists of a red pass filter portion, a green pass filter portion and a blue pass filter portion. The respective filter portions extend along the fluorescent display panel 62 and are displaced from each other in a perpendicular direction Y to the fluorescent display panel 62. Since the printing head 43 and thus the fluorescent display panel 62 extend in the main scan direction M, the direction Y corresponds to the sub scan direction S. By shifting the color filter 63 in the direction Y in response to a filter switching signal, these filter portions are seriatim positioned in the white light path. Thus, one of the three color components that passes through the color filter 63 is directed through a mirror 64, a micro lens array 65 and a mirror 66 to an opening 61a of the housing 61, and then projected as printing light of one color onto the instant film sheet 10. The micro lens array 65 consists of an array of micro cylindrical lenses, called SELFOC lens (a trade name), that prevents the printing light beans from diverging to other pixel areas.

Referring back to FIG. 3, the head conveying mechanism 48 extends in the sub scan direction, and its bottom end is extended beyond the film pack 14 such that an initial position 43a of the printing head 43 is located outside the film pack 14, as shown by phantom lines in FIG. 3. According to this configuration, it is possible to pre-drive the fluorescent display panel 62 of the printing head 43 without exposing the instant film sheet 10 to the light from the printing head 43, as will be described in detail later. A position 43b of the printing head 43 that is shown by chain-dotted line is a print start position where the opening 61a is opposed to a bottom end of the exposure opening 14b.

In this embodiment, the optical printer unit prints a full-color image in a three-color frame sequential fashion while the printing head 43 makes three laps between the print start position 43b to a print end position where the opening 61a is opposed to a top end of the exposure opening 14b, as shown by solid lines in FIG. 3.

Figure 5:
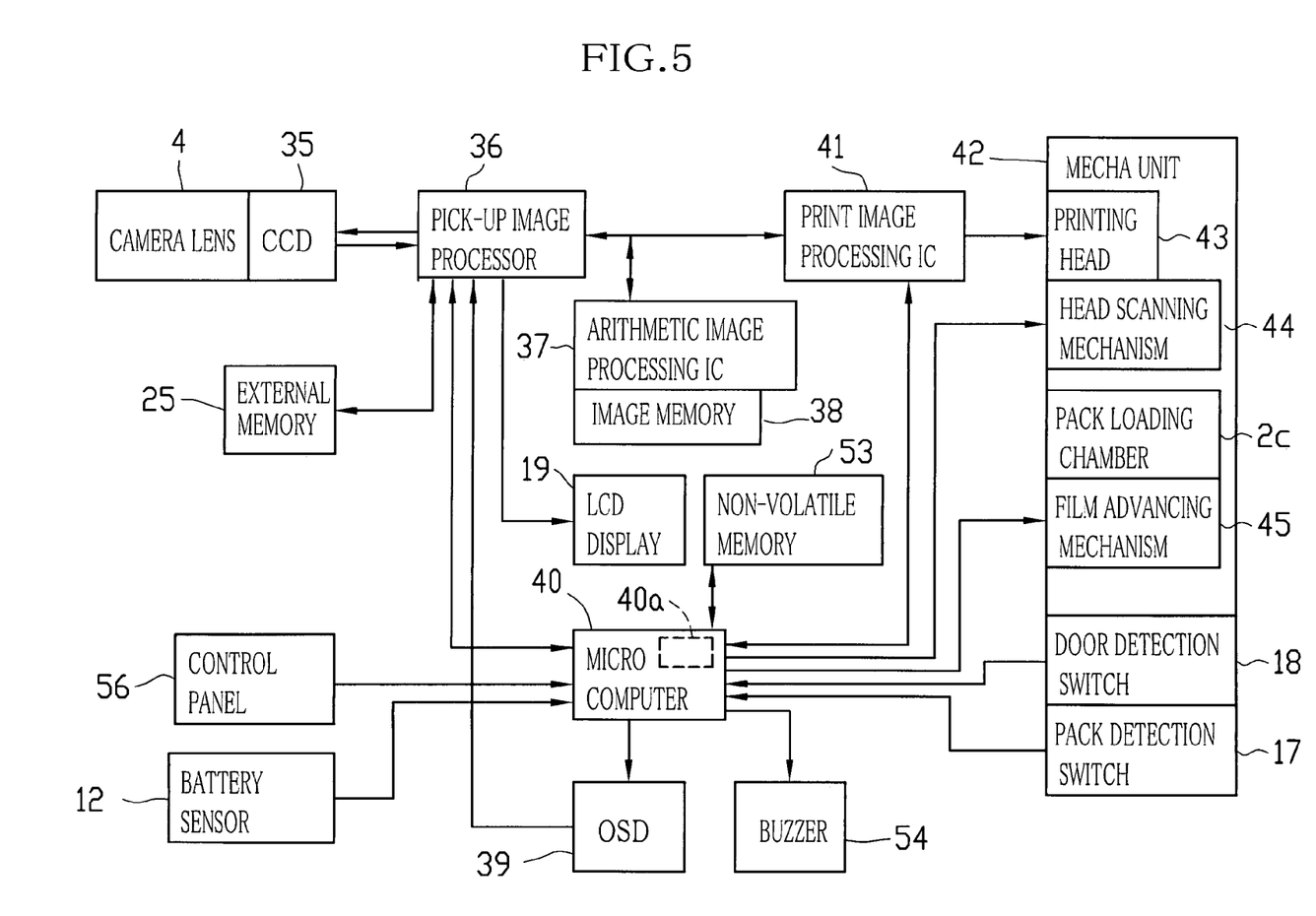
FIG. 5 is a block diagram illustrating the circuitry of the printer-incorporated electronic still camera.

FIG. 5 shows an electric structure of the still camera. In FIG. 5, a mechanism unit 42 is constituted of the pack loading chamber 2c, the pack detection switch 17, the door detection switch 18, the printing head 43, the head scanning mechanism 44 and the film advancing mechanism 45. The camera lens 4 includes a photographic optical system, a shutter mechanism and a stop mechanism. A CCD image sensor 35 is placed behind the camera lens 4, so an optical image of a subject is formed on a photo-electric conversion surface of the CCD image sensor 35. The CCD image sensor 35 converts the optical image into electric image signals of three colors, and outputs them to a pick-up image processor 36.

The pick-up image processor 36 is constituted of a plurality of ICs, and carries out many kinds of operations under the control of an arithmetic image processing IC 37. For instance, the pick-up image processor 36 controls the stop aperture size and the shutter speed of the camera lens 4, controls the CCD image sensor 35 for picking up three color (RGB) image signals of one frame, and converts the RGB image signals into a digital YCrCb signal that is composed of a luminance signal and a color-difference signal, for storing it in an image memory 38. The pick-up image processor 36 also reads out the YCrCb signal from the image memory 38 and converts it into an NTSC picture signal and sends it to the LCD panel 19, adds character signals from an on-screen display IC (OSD) 39 to the picture signal, communicates with a microcomputer 40 by means of serial signals, and interfaces the external memory 25 with the arithmetic image processing IC 37 such that image data stored as the YCrCb signal in the image memory 38 may be written on the external memory 25 after the image data is compressed in the arithmetic image processing IC 37, and that compressed image data may be read out from the external memory 25 and sent to the arithmetic image processing IC 37.

The arithmetic image processing IC 37 controls the pick-up image processor 36 for reading out image data from the image memory 39 and writing image data in the image memory 39. The arithmetic image processing IC 37 also converts image data from the YCrCb format into another format that is suitable for the external memory 25, or restoring it to the YCrCb format, and coverts image data of the YCrCb format into print data that is suitable for a print image processing IC 41. The print image processing IC 41 receives print data from the arithmetic image processing IC 37 in a line sequential fashion. The print image processing IC 41 includes a line memory for storing the print data line by line, and outputs drive data to the printing head 43 based on the print data of one line in a manner as set forth later.

The image memory 38 is an IC memory that stores image data in the YCrCb format. The image memory 38 may be included in the arithmetic image processing IC 37. A non-volatile memory 53, e.g. EEPROM, stores many kinds of control sequences which are referred to by the microcomputer 40. An alarming buzzer 54 is controlled by the microcomputer 40. A control panel 56 is a man-machine interface panel that connects the microcomputer 40 to the release button 8, the mode selection dial 20, the execution key 21, the cancel key 22, the print key 24 and other operation members.

The microcomputer 40 includes a timer 40a that is mainly used for measuring how long the printing head 43 has been left inactive. When the printing head 43 is driven after the printing head 43 is kept inactive for more than a predetermined time, e.g. 48 hours or more, the fluorescent display panel 62 is preliminary turned on before starting printing an image, as will be described in detail later.

Figure 6:
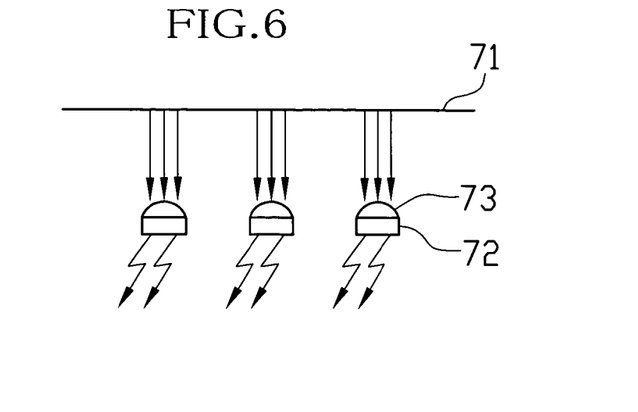
FIG. 6 is an explanatory diagram illustrating essential elements of a fluorescent display panel of the printing head.

As shown in FIG. 6, the fluorescent display panel 62 has a filament 71, and anodes 72 are placed underneath the filament 71. Fluorescent objects 73 are put on one side of each anode 72 that faces the filament 71. A constant AC voltage is applied across the filament 71. When a sufficiently high DC voltage is applied to the anodes 72, as compared to the voltage across the filament 71, the filament 71 radiates thermions toward the anodes 72. The thermions clash against the fluorescent objects 73, so the fluorescent object 73 is excited to emit light beams. The light beams are projected toward the color filter 63. It is to be noted that the fluorescent display panel 62 has a glass casing whose inside is maintained substantially vacuum, in which the filament 71, the anodes 72 and other elements are contained.

Figure 7:
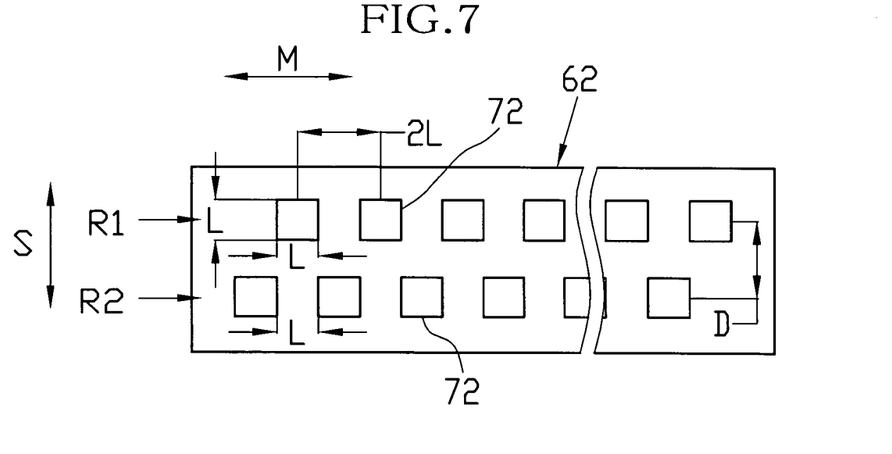
FIG. 7 is an explanatory diagram illustrating an arrangement of anodes of the fluorescent display panel.

FIG. 7 shows the anodes 72 as viewed from an opposite side to the filament 71. Each anode 72 has a square shape, and corresponds to one pixel on printing. The anodes 72 are arranged in two rows R1 and R2 along the main scan direction M, and at constant intervals in each row. Provided that one side of the anode 72 has a length L, the interval is "2L (=2×L)". The anodes 72 of the first row R1 are staggered from those of the second row R2 by the length L, whereas a center of the second row R2 is spaced from a center of the first row R1 by a distance D in the sub scan direction S. The distance D is determined such that the printing head 43 is moved by an amount of L/2 in the sub scan direction S, each time half of dots of one line are recorded on the instant film sheet 10, so that even dots of one line which are recorded by light beams from the anodes 72 of the first row R1, are aligned with odd dots of the same line which are recorded by light beams from the anodes 72 of the second row R2.

Figure 8:
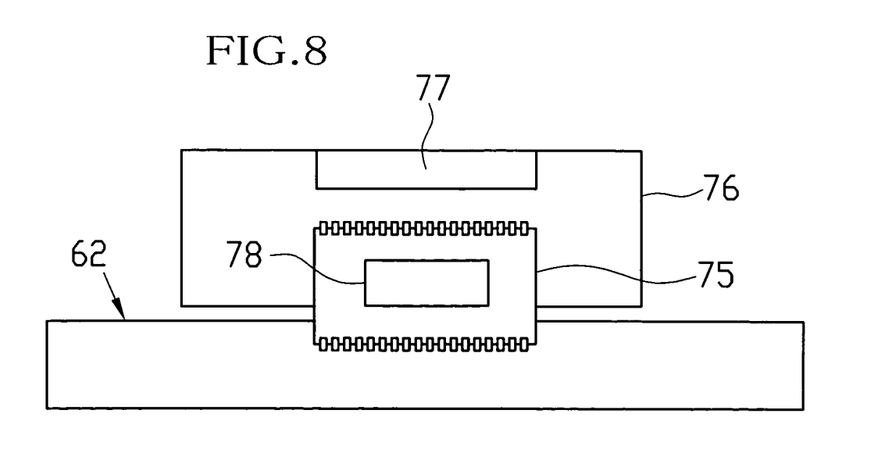
FIG. 8 is an explanatory diagram illustrating a flexible substrate and a printing head substrate of the printing head.

As shown in FIG. 8, the fluorescent display panel 62 is connected to a printing head substrate 76 through a flexible substrate 75. The printing head substrate 76 is connected to the print image processing IC 41 through a connector 77. A driver IC 78 is mounted on the flexible substrate 75 so that the print data and a printing head control signal from the print image processing IC 41 are entered through the connector 77, the printing head substrate 76 and the flexible substrate 77 into the driver IC 78. The driver IC 78 controls the anodes 72 individually in accordance with the print data, such that quantities of the light beams emitted from the individual anodes 72 vary depending upon densities of the corresponding pixels. However, on the preliminary emission of the fluorescent display panel 62, a constant voltage is applied at once to all of the anodes 72 in response to a command from the microcomputer 40.

Now the operation of the still camera configured as above will be described.

When the power switch 3 is turned on, a power signal from the power switch 3 is entered through the control panel 56 into the microcomputer 40, then the microcomputer 40 sets up the still camera in a mode that is determined according to the rotational position of the mode selection dial 20. For instance, when the power switch 3 is turned on while the indicia for the setup mode on the mode selection dial 20 is mated with the index 27, the still camera is set to the setup mode. In the setup mode, many kinds of setup operations may be carried out. For example, the quality of photographed image is selected by designating a data compression rate of image data written in the external memory 25. It is also possible to designate the number of hard copies of a selected picture frame to print in a continuous succession. These setup values are entered when the still camera is shifted to another mode by rotating the mode selection dial 20.

When the indicia for the photography mode on the mode selection dial 20 is mated with the index 27, the still camera is set to the photography mode. In the photography mode, RGB image signals from the CCD image sensor 35 is converted into image data and thereafter into the NTSC picture signal through the pick-up image processor 36. The NTSC signal is sent to the LCD panel 19, so the LCD panel 19 displays images of subjects in a real time fashion.

When the release button 8 is operated in the photography mode, a release signal is sent to the microcomputer 40, so the microcomputer 40 outputs a photography command to the arithmetic image processing IC 37 through the pick-up image processor 36. Then the arithmetic image processing IC 37 controls the pick-up image processor 36 to drive the shutter mechanism in the camera lens 4, for blocking light from the CCD image sensor 35, so that the CCD image sensor 35 accumulates electric charges in accordance with an optical image to be photographed. Next, the pick-up image processor 36 picks RGB image signals from the CCD image sensor 35, and converts them into the YCrCb signals, and sends them to the arithmetic image processing IC 37.

The arithmetic image processing IC 37 writes the YCrCb signals as image data in the image memory 38. After the image data of one frame is written on the image memory 38, the arithmetic image processing IC 37 converts the image data of one frame into a compressed format that is adapted to the external memory 25, and sends it to the pick-up image processor 36. Then, the pick-up image processor 36 writes the compressed image data on the external memory 25.

When the reproduction mode is selected by operating the mode selection dial 20, a reproduction command is entered through the control panel 56 into the microcomputer 40. The microcomputer 40 sends the reproduction command to the arithmetic image processing IC 37 via the pick-up image processor 36. Then the arithmetic image processing IC 37 controls the pick-up image processor 36 to read out the image data from the external memory 25 through the pick-up image processor 36. By operating the cursor key 28, an appropriate frame is designated to be reproduced. Then, image data of the designated frame is read out from the external memory 25, and is reconverted into the YCrCb signals in the arithmetic image processing IC 37, and the YCrCb signals are written on the image memory 38. After the image data of one frame is written as the YCrCb signal on the image memory 38, the pick-up image processor 36 reads out the image data from the image memory 38 and, at the same time, converts it into NTSC signals and sends them to the LCD panel 19. As a result, the LCD panel 19 displays a still image reproduced from with the NTSC signal.

Figure 10:
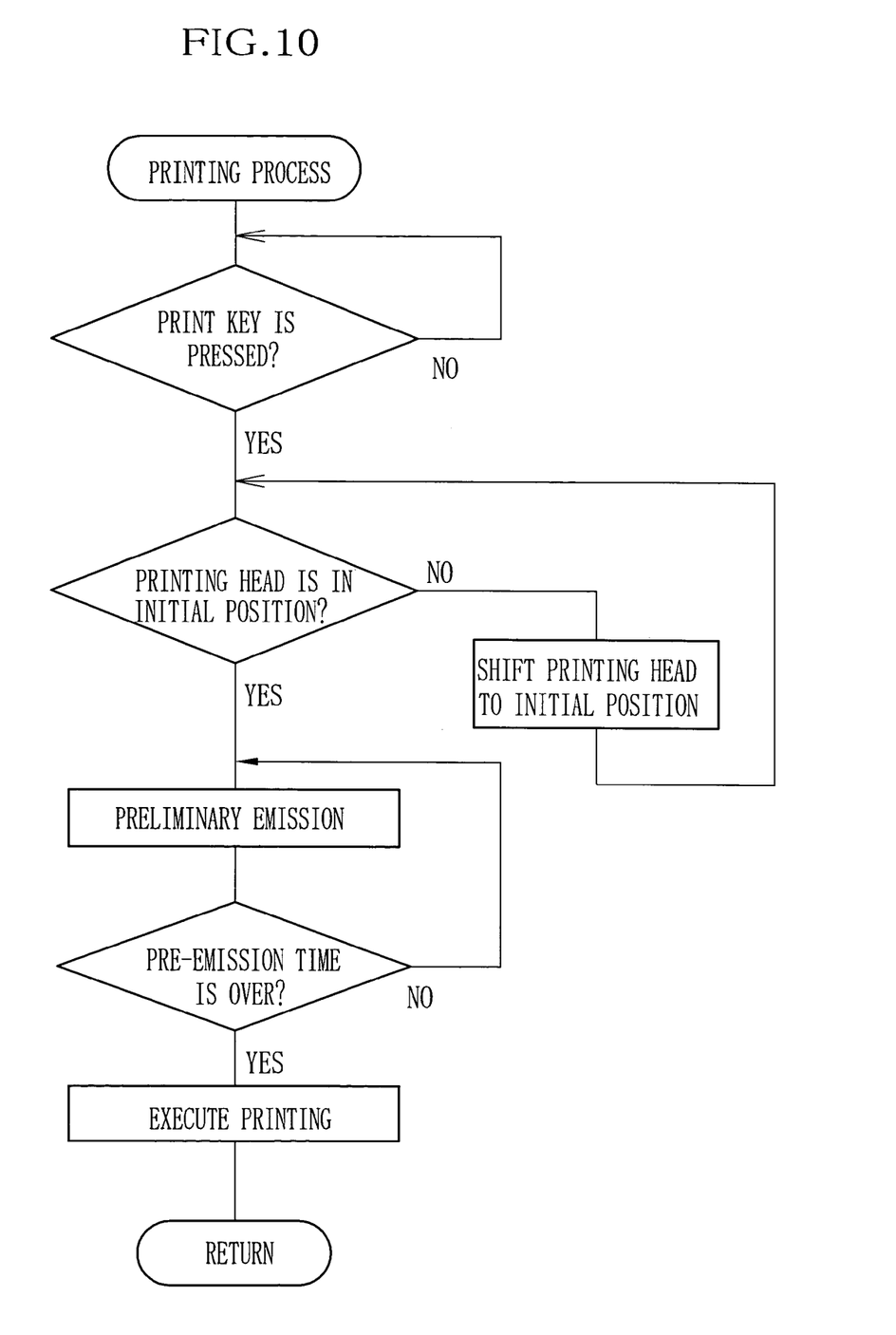
FIG. 10 is a flow chart illustrating a printing process of the printer-incorporated electronic still camera.

When the print key 24 is operated in the reproduction mode, a print command is entered in the microcomputer 40. Then, the microcomputer 40 starts a printing process for making a hard of an image presently displayed on the LCD panel 19. In the printing process, as shown in FIG. 10, the microcomputer 40 first checks if the printing head 43 is placed at the initial position 43a and, if not, drives the head scanning mechanism 44 to move the printing head 43 to the initial position 43a. Thereafter, a constant DC voltage is applied to all of the anodes 72 for a predetermined time, e.g. for ten seconds, thereby to eliminate the floating gas, which remains in the fluorescent display panel 62 and is deposited on the fluorescent objects 73 during the inactive period of the fluorescent display panel 62, from the fluorescent objects 73. So the fluorescent display panel 62 may emit light at an uniform luminance, even though the fluorescent display panel 62 is left inactive for a long time.

After executing this preliminary emission step, the microcomputer 40 outputs the print command to the pick-up image processor 36 and 41. Then the pick-up image processor 36 outputs the print command to the arithmetic image processing IC 37, so the arithmetic image processing IC 37 converts the image data stored in the image memory 38, that is the image data of the presently displayed image on the LCD display 19, into print data whose format is adapted to the printing head 43, and rewrite the image memory 38 with the print data. After the print data of one frame is written on the image memory 38, the arithmetic image processing IC 37 transfers the print data line after line to the print image processing IC 41, so the print image processing IC 41 sequentially stores the print data of one line in its line memory.

In this instance, a full-color image is recorded in a three color frame sequential fashion in the order from red, green and blue. Upon the print command, the red pass filter portion of the color filter 63 is first inserted in the light path of the fluorescent display panel 62, and the print image processing IC 41 first produces drive data for red pixels of a first line from the print data of the first line. Provided that the pixels should have 256 gradations, the drive data for each pixel is constituted of a number of drive pulses, the number varying in a range from 0 to 256 depending upon the tonal grade of that pixel.

Figure 9:
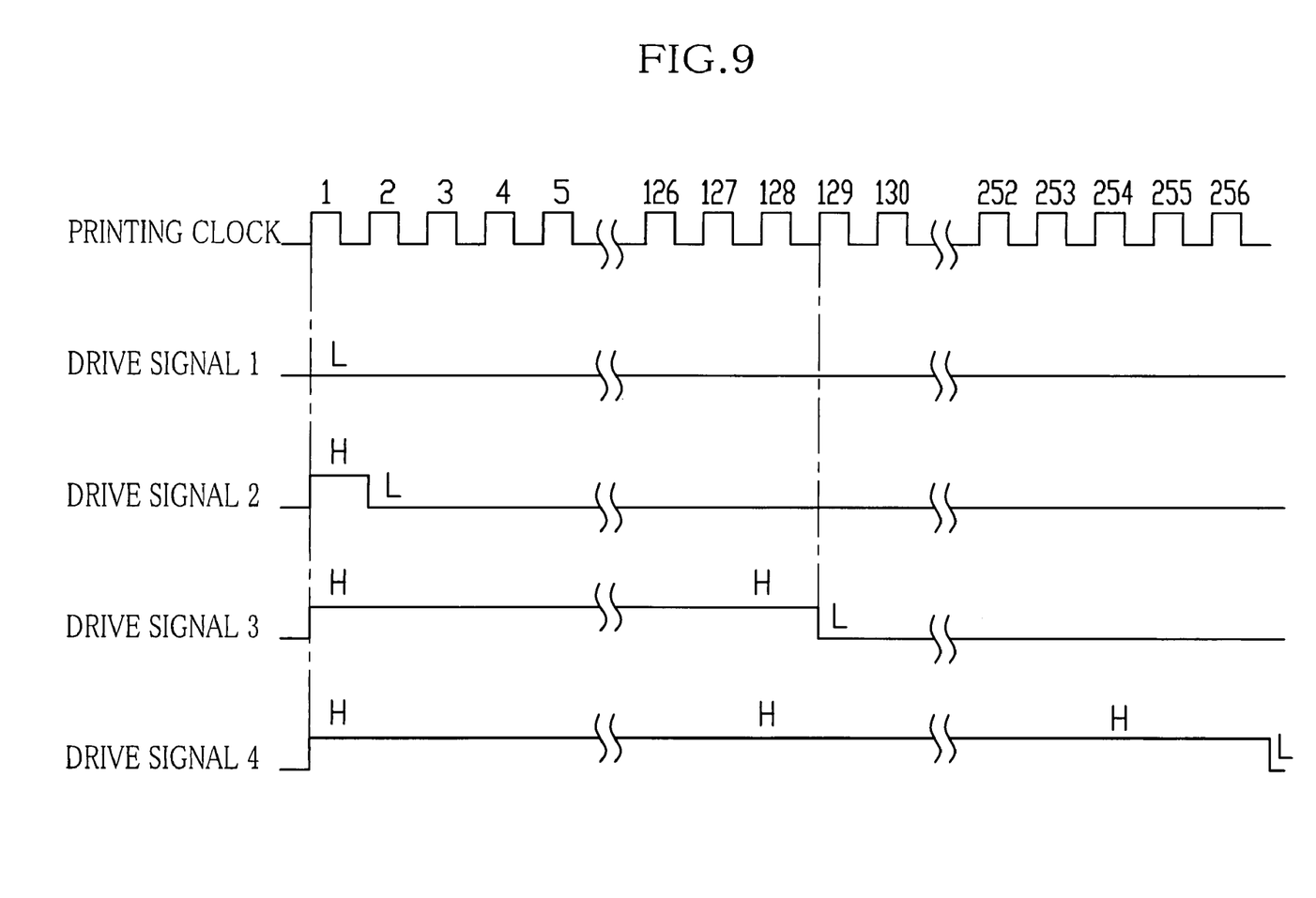
FIG. 9 is timing charts illustrating driving operations of the anodes for different exposure amounts.

More specifically, because the instant film sheet 10 develops a color at an exposed portion depending upon the color of printing light, and unexposed portions remains black, the tonal grade "0", corresponds to black, whereas the tonal grade "256" corresponds to white, if the printing light is white. Therefore, as shown in FIG. 9, the print image processing IC 41 modifies width of a drive signal for each pixel depending upon the print data of that pixel, and outputs the drive pulses to the printing head 43 based on the drive signal in synchronism with a printing clock signal.

As described above, since the anodes 72 of the first row R1 and those of the second row R2 should be driven alternately, the print image processing IC 41 produces the drive data for red of even pixels of the first line from the print data, and outputs the drive data as different numbers of drive pulses to the individual anodes 72 of the first row R1 at the timing of the printing clock signal. Thus, every second red dots of the first line are recorded as latent images with different densities. Thereafter, the printing head 43 is moved by the predetermined amount in the sub scan direction, and the print image processing IC 41 produces the drive data for red of odd pixels of the first line from the print data. Then, the print image processing IC 41 outputs the drive data as different numbers of drive pulses to the individual anodes 72 of the second row R2 at the timing of the printing clock signal, so other half of red dots of the first line are recorded as latent images between the previously recorded red dots.

While the anodes 72 of the second row R2 emit light beams to record the odd dots of the first line, the arithmetic image processing IC 37 transfers print data of a second line to the print image processing IC 41, so the print image processing IC 41 produces the drive data for red of even pixels of the second line from the print data. When all the red dots of the first line are recorded, the printing head 43 is moved by the predetermined amount in the sub scan direction. Then the print image processing IC 41 outputs the drive data for red of even pixels of the second line as different numbers of drive pulses to the individual anodes 72 of the first row R1 at the timing of the printing clock signal. Thereafter, the printing head 43 is moved by the predetermined amount in the sub scan direction. Then the print image processing IC 41 produces the drive data for red of odd pixels of the second line from the print data, and outputs the drive data as different numbers of drive pulses to the individual anodes 72 of the second row R2 at the timing of the printing clock signal. In this way, even red dots and odd red dots of each line are alternately recorded as latent images on the instant film sheet 10, as the printing head 43 is moved in the sub scan direction S.

When the printing head 43 reaches the print end position and thus a predetermined number of lines of red dots are recorded, the printing head 43 is moved back to the print start position 43b. Then, the green-pass filter portion of the color filter 63 is inserted into the light path from the fluorescent display panel 62 under the control of the microcomputer 40. Thereafter, green dots are recorded as latent images in accordance with drive data for green in the same way as for the red dots. After the green dots are entirely recorded, the printing head 43 is moved back again from the print end position to the print start position 43b, to record blue dots in the same way as for the red and green dots.

When the three color dots are entirely recorded on the instant film sheet 10, the microcomputer 40 drives the film advancing mechanism 45 to eject the instant film sheet 10 through the spread rollers 51 out of the camera body 2, in the same way as in a conventional instant camera. While the instant film sheet 10 is being squeezed through the spread rollers 51, the pod is ruptured and the processing fluid is spread between the photosensitive layer and the image receiving layer. Thereby, the latent image is developed into a positive image in a few minutes after the ejection.

To print another picture frame in succession, the frame to print is selected by operating the cursor key 28 in the reproduction mode, and the print key 24 is pressed while the frame to print is displayed on the LCD panel 19. Then, the displayed frame is printed in the same way as described above. If a plural number of hard copies of the same picture frame are to be made in succession, the printing process is automatically restarted based on the same image data. By pressing the cancel key 22 during the successive printing, the printing process is terminated after the last exposed instant film sheet 10 is ejected, and the still camera returns to the reproduction mode.

In the present embodiment, the preliminary emission process of the fluorescent display panel 62 is executed not only immediately before starting printing, but also when it is determined by the timer 40a that the fluorescent display panel 62 is left inactive for a predetermined time, e.g. for 48 hours. It is possible to execute the preliminary emission process at appropriate occasions in addition to or instead of these timings. For example, the preliminary emission process may be done when a new film pack 14 is loaded, when the batteries are changed or recharged if the batteries are of a rechargeable type, and/or when the power switch 3 is turned on.

To detect when the batteries are changed, the battery sensor 12 is provided, To detect when the batteries are recharged, a device for detecting a steep increase in battery voltage is provided. If the still camera is loaded with specific batteries for printing separately from those for photography, it is preferable to carry out the preliminary emission process when the batteries for printing are changed or recharged.

The switching condition of the pack detection switch 17 is usable for detecting when the film pack 14 is changed. Where the preliminary emission process is executed immediately after a new film pack 14 is loaded, it is unnecessary to displace the printing head 43 from the film pack 14 to the initial position 43a prior to driving the fluorescent display panel 62, because the exposure opening 14b is closed by the light-shielding sheet 15.

Although the initial position 43a of the printing head 43 is set outside the film pack 14 in the above embodiment, it is possible to define the print start position 43b as an initial position of the printing head 43, and move the printing head 43 out of the film pack 14 when the preliminary emission process of the fluorescent display panel 62 is carried out.

The configuration of the fluorescent display panel 62 is not to be limited to the above embodiment but may be modified appropriately. For example, it is possible to arrange all anodes in a row. In that case, the movement of the printing head in the sub scan direction and the driving timing of the fluorescent display panel are controlled in a correspondingly modified manner.

Although the present invention has been described with respect to the printer-incorporated electric still camera, the present invention is applicable to an independent optical printer that uses the fluorescent display panel for exposing the instant film sheet.

Thus, the present invention is not to be limited to the above embodiments but, on the contrary, various modifications are possible to those skilled in the art without departing from the scope of appended claims.

What is claimed is:

1. A printing method for an optical printer wherein a fluorescent display panel is driven as a light source of a printing head based on electronic image data to print an image on a photographic recording medium, the fluorescent display panel having an array of light emitting elements, the printing method comprising:

providing an exposure area for accepting the photographic recording medium;

introducing the recording medium to the exposure area; and performing a preliminary emission process that is executed before the optical printer actually starts printing an image, to drive all of the light emitting elements of the fluorescent display panel for a constant time to remove deposited residual gas off the light emitting elements, wherein the printing head is moved out of the exposure area during the preliminary emission process, and wherein a time period for performing the preliminary emission process includes a period where the photographic recording medium is in the exposure area.

2. A printing method as claimed in claim 1, wherein the preliminary emission process is executed immediately before each image starts being printed.

3. A printing method as claimed in claim 1, wherein the preliminary emission process is executed immediately after a power switch of the printer is turned on.

4. A printer-incorporated electronic still camera having an imaging device for obtaining electronic image signals from optical images, a storage device for storing the electronic image signals in a memory, and a printing device for printing an image on a photographic recording medium based on the electronic image signals read out from the memory, the still camera comprising:

a fluorescent display panel as a light source of a printing head of the printing device, the fluorescent display panel comprising an array of light emitting elements in a vacuum container;

an exposure section for accepting the photographic recording medium;

a driving device for driving the light emitting elements, the driving device making a preliminary emission process to drive all of the light emitting elements for a constant time before driving the light emitting elements to print an image on the photosensitive recording medium based on the electronic image signals, and a head scanning device for moving the printing head from an end to another end of the exposure section to print an image on the photographic recording medium, wherein the head scanning device removes the printing head from the exposure section during the preliminary emission process, and wherein a time period for performing the preliminary emission process includes a period where the photographic recording medium is in the exposure section.

5. A printer-incorporated electronic still camera as claimed in claim 4, further comprising a timer for measuring an inactive period of the fluorescent display panel, wherein the driving device makes the preliminary emission process when the timer detects that the fluorescent display panel has not been driven for a predetermined time.

6. A printer-incorporated electronic still camera as claimed in claim 4, further comprising a battery detection device for detecting whether power source batteries are loaded in the still camera or not, wherein the driving device makes the preliminary emission process when the battery detection device detects that the power source batteries are newly loaded.

7. A printer-incorporated electronic still camera as claimed in claim 4, further comprising a detection device for detecting whether the photographic recording medium is loaded in the still camera or not, wherein the driving device makes the preliminary emission process when the detection device detects that the photographic recording medium is newly loaded.

8. A printer-incorporated electronic still camera as claimed in claim 7, wherein the photographic recording medium is a self-development type photo film sheet, and the still camera is provided with a pack loading chamber for loading a film pack containing a plurality of self-development type photo film sheets therein, and wherein the detection device is located in the film loading chamber to detect whether the film pack is loaded or not.

9. The printing method of claim 1, wherein a color filter is disposed in a light path of the fluorescent display panel during exposure of the recording medium.

10. The printing method of claim 1, wherein a micro lens array is disposed in a light path of the fluorescent display panel during exposure of the recording medium.

11. The printing method of claim 9, wherein the color filter is one of a red filter, a blue filter and a green filter.

12. The still camera of claim 4, comprising:
a color filter, wherein the color filter is disposed in a light path of the fluorescent display panel during exposure of the recording medium.

13. The still camera of claim 4, comprising:
a micro lens array, wherein the micro lens array is disposed in a light path of the fluorescent display panel during exposure of the recording medium.

14. The still camera of claim 12, wherein the color filter is one of a red filter, a blue filter and a green filter.

15. The printer-incorporated electronic still camera as claimed in claim 4, further comprising a battery detection device for detecting whether rechargeable power source batteries have been recharged, wherein the driving device makes the preliminary emission process upon detection that the rechargeable power source batteries have been recharged.

* * * * *